United States Patent Office 3,183,323
Patented May 11, 1965

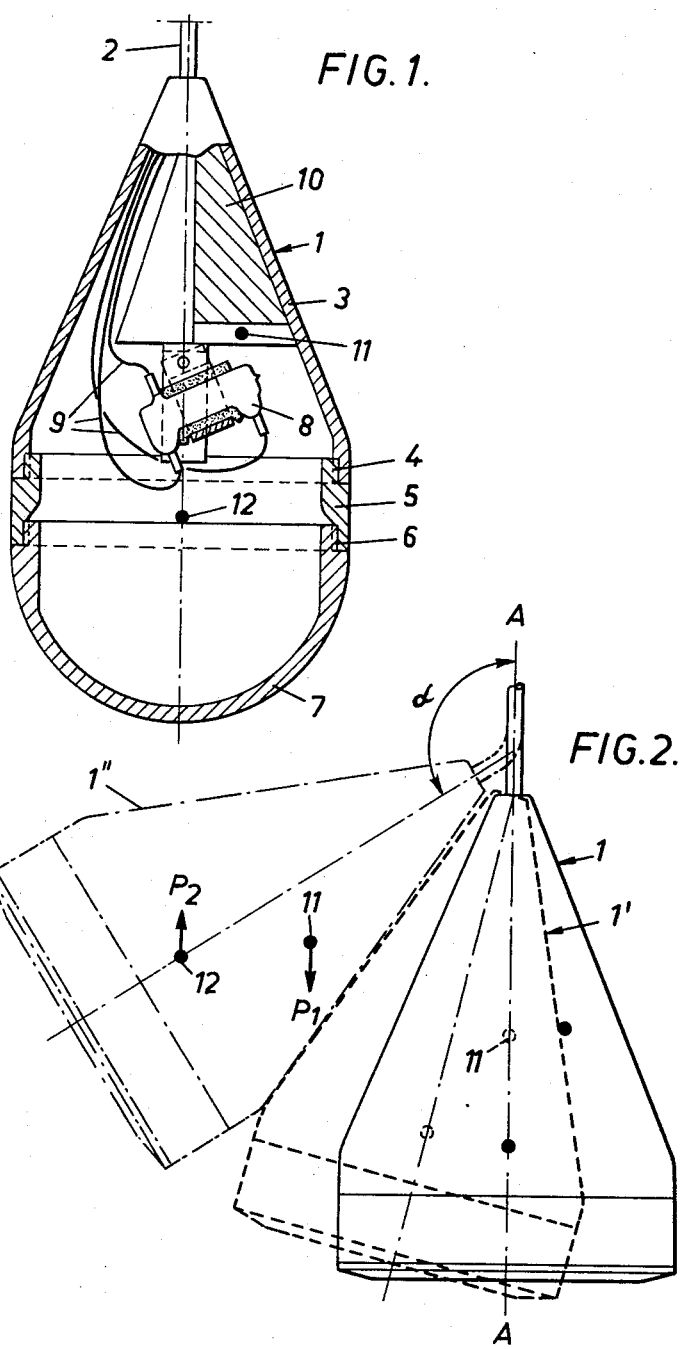

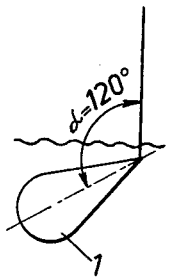

3,183,323
SUBMERGED FLOAT SWITCH WITH MEANS TO MUTUALLY ADJUST THE METACENTER AND CENTER OF GRAVITY
Sixten Englesson, Djursholm, Sweden, assignor of one-half to AB Flygts Pumpar, Solna, Sweden
Filed Nov. 2, 1962, Ser. No. 234,917
Claims priority, application Great Britain, Nov. 7, 1961, 39,763/61
4 Claims. (Cl. 200—84)

This invention relates to means for indicating the level or the presence of a liquid in a receptacle or reservoir.

It is known to indicate the level or the presence of liquid in a receptacle by aid of a hollow body enclosing a switch adapted to control an electric circuit when angularly moved in a vertical plane to an oblique position. Said hollow body may be floating or heavier than the liquid.

The present invention has for its object to improve indicating means of the latter non-floating type in which the metacentre of the hollow body is spaced relative to its centre of gravity. The hollow body is pendulously suspended so that it will take up a substantially vertical position when hanging in air.

Due to said spaced relation of the metacentre and the centre of gravity of the hollow body, said hollow body will take up an oblique position when entirely immersed in a liquid. The angle for said oblique position is determined by the state of equilibrium of the downward torque about the suspension point created by the gravity force acting in the centre of gravity and the upward torque about said suspension point created by the buoyant force acting in the metacentre. The magnitude of said upward torsional force depends on the buoyant force of the hollow body and the distance between the metacentre and the suspension point of the hollow body as well as on the specific density of the liquid in which the body is immersed.

It is a main object of the invention to achieve a definite indication of the height of the liquid level within short limits. Owing thereto the switch means must be very sensitive for a given oblique position of the body and thus said body must take up a definite predetermined angular position in a given direction in a vertical plane when entirely immersed in a liquid of any specific density.

For this purpose in a device as described according to the invention the metacentre and the centre of gravity of said body are mutually adjustable in response to the density of the liquid in order to obtain said predetermined oblique position when entirely immersed in said liquid.

Said adjustment of the respective centres relative to each other may be carried out in several manners either by changing the position of the centre of gravity of the metacentre in connection with a change of the volume of the hollow body.

Preferably the adjustment of said centres is carried out according to the invention by changing the shape and volume of said hollow body. This is easily accomplished by aid of changeable cap means of various size for a main part of said hollow body and/or by inserting a spacer ring of selected size between said cap and said main part.

The invention will now be described by way of example with reference to the accompanying drawings, in which:—

FIG. 1 shows a sectional view of a pendulously suspended indicating member according to the invention;

FIG. 2 is an elevational view of said member taking up different oblique positions; and FIG. 3 is a diagram showing the shape and size of caps and spacers for obtaining a predetermined angular position of the member in liquids of different specific densities.

Referring now to FIG. 1 a pear-shaped hollow body or operating member 1 is suspended from a flexible cable 2, so that said member 1 can freely swing about a point near its upper end. Said operating member consists of a hollow body composed of a conical shell main portion 3 having inward threads 4 at its large end. A spacer ring 5 outwardly threaded at its one end and inwardly threaded at 6 at its other end is screwed to said conical main portion 3. To said spacer ring 5 a cap 7 of suitable shape such as semi-spherical shape is outwardly threaded at its one end and screwed to said spacer ring. Said parts 3, 5, 7, screwed to each other, form a closed cavity in which a switch 8 is provided. Said switch 8, being suitably a mercury switch, is adapted to operate in one or more predetermined angular positions in a vertical plane. Conductors 9 are drawn through the suspension cable 2 to a suitable controlling relay or switch for an indicator device, pump motor or similar. Within said uniform cavity a weight indicated at 10 is provided for the purpose of displacing the centre of gravity 11 of the operating member laterally with respect to the metacentre 12 or the centre of buoyancy calculated on the total displacement of the member 1. However it is easily understood that an eccentric load may be obtained in any other way than that shown on the drawings, for instance by a suitable irregular form of the member 1 itself.

In FIG. 2 an operating member 1 is shown in different positions. The position drawn in full lines corresponds to the position shown in FIG. 1 symmetrically about a vertical line A—A. The position indicated by 1' shown in dashed lines indicates the position the member takes up when hanging in air, that is, with its centre of gravity 11 coinciding with the vertical line A—A. Finally the oblique position of the member indicated by 1" and shown in dash and dot lines represents the angular position the member takes up in order to cause the switch 8 to switch over. Said oblique position is defined by the angle $\alpha$ between the centre line of the operating member and the vertical line A—A. In this position the gravity force $P_1$ acting in the centre of gravity 11 and the buoyant force $P_2$ acting in the metacentre 12 should be balanced. It is easily understood that the force $P_2$ will vary in dependence of the specific density of the liquid in which the operating member is immersed. On the other hand a too small or too great force $P_2$ will give the operating member a different angular position so that the switch will not act securely.

According to the invention the location of the metacentre 12 and the value of the buoyant force $P_2$ can be easily selected by the provision of caps 7 and 7', FIG. 2, of different sizes and in combination with any of said caps 7, 7', the length of the spacer ring 5 can be further varied.

In FIG. 3 a diagram is shown relating to two types of caps such as 7, FIG. 1, and 7', FIG. 2 respectively. The abscissa of the diagram has two scales, the left of the zero mark one relating to a flat disk-shaped cap 7' as shown in FIG. 2 and the right one relating to the semi-spherical cap 7 as shown in FIG. 1. The two abscissa scales relate to the length of the spacer ring 5. The ordinate represents the specific density of the liquid. The curve is composed of two branches B and C coinciding together in the point D and gives the relation between the length of the spacer rings and the specific density for a given oblique angle $\alpha$ of 120° as schematically shown in the upper right part of the diagram. By selecting a suitable cap 7 or 7', and a spacer ring 5 of suitable length, the indicating device may be matched to any specific density of the liquid such as sludge, water, oil, gasoline etc.

From the foregoing it will be understood that an operating member 1 can be adapted to any specific density of the liquid and will operate with great accuracy in indicating the level of liquid due to the fact that the switch will not switch over until the operating member is just entirely immersed.

It is further to be noticed that the operating member may be used not only for indicating the level of a free liquid surface but also of a surface separating two liquids of different specific densities.

As by way of example two operating members located at different heights in a vessel may be used for controlling, for instance, a drainage pump connected to the receptacle. Assume that a liquid reaches a level intermediate said two operating members and that the drainage pump is standing still. The upper operating member hangs nearly straight down as shown by dashed lines in FIG. 2 while the lower operating member takes up an oblique position as shown by dash and dot lines in FIG. 2 entirely immersed in the liquid. When the liquid level has risen to the upper operating member and completely encloses the same the buoyance acting in point 12 swings the pendulous member 1 to said definite oblique position as shown by dash and dot lines in FIG. 2. Thereby the mercury switch 8 is caused to change over and gives an impulse for starting the pump motor, which then works, if the electric circuit includes a holding circuit for the upper switch 8, until the level has sunk to a point where the lower operating member is moved to its nearly vertical position shown by dash lines, thereby causing the switch to change over and give an impulse for opening the electrical circuit of the pump motor. It should be noticed that said operating members may also be used for controlling the electrical circuit of audible or visible warning devices for the purpose of signalling for instance when a predetermined level is reached in a liquid body.

I claim:

1. In a device for indicating the level of liquids of various densities comprising a hollow body pendulously suspended in a vessel for a liquid, said body enclosing a switch adapted to control an electric circuit when angularly moved in a vertical plane to an oblique position, means for loading said hollow body so that it will be submerged in the respective liquid eccentrically in such a manner that the metacentre mean of the hollow body is spaced relative to its centre of gravity, and means for mutually adjusting the metacentre and centre of gravity in order to obtain a predetermined oblique position when said body is immersed in said liquid.

2. In a device for indicating the level of liquids of various densities comprising a hollow body pendulously suspended in a vessel for a liquid, said body enclosing a switch adapted to control an electric circuit when angularly moved in a vertical plane to an oblique position, means for loading said hollow body so that it will be submerged in the respective liquid eccentrically in such a manner that the metacentre mean of the hollow body is spaced relative to its centre of gravity, means for mutually adjusting the metacentre and centre of gravity comprising a main part of said body, and an exchangeable cap tightly secured to said main part, whereby there is obtained a predetermined oblique position when said body is immersed in said liquid.

3. In a device according to claim 2 said means further comprising a spacer member of predetermined length inserted between said main part and said cap.

4. In a device for indicating the level of liquids of various densities a hollow body pendulously suspended in a vessel for a liquid and enclosing a switch adapted to control an electric circuit when angularly moved in a vertical plane to an oblique position, said hollow body comprising a cone shaped shell having a weight eccentrically located therein and being threaded at its large end, a threaded cylindrical spacer of predetermined length screwed to said cone shaped main part and a threaded cap of predetermined volume screwed to said spacer, said spacer and cap each being exchangeable for the mutual adjustment of the metacentre and the centre of gravity.

References Cited by the Examiner

UNITED STATES PATENTS 2,600,659   6/52   Koch _____ 200—84

BERNARD A. GILHEANY, *Primary Examiner.*

ROBERT K. SCHAEFER, *Examiner.*